United States Patent
Kang et al.

(10) Patent No.: US 10,155,661 B2
(45) Date of Patent: Dec. 18, 2018

(54) SYSTEM AND METHODS FOR IMPROVING NATURAL GAS USAGE IN STEAM METHANE REFORMERS

(71) Applicant: L'Air Liquide, Societe Anonyme pour l'Etude et l'Exploitation des Procedes Georges Claude, Paris (FR)

(72) Inventors: Taekyu Kang, Houston, TX (US); Swatantra Kumar Shrivastava, Lich (DE); Maik Lehmann, Frankfurt am Main (DE)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 4 days.

(21) Appl. No.: 15/417,803

(22) Filed: Jan. 27, 2017

(65) Prior Publication Data

US 2018/0215617 A1 Aug. 2, 2018

(51) Int. Cl.
*C01B 3/38* (2006.01)
*C01B 3/48* (2006.01)
(Continued)

(52) U.S. Cl.
CPC .............. *C01B 3/36* (2013.01); *C01B 3/384* (2013.01); *C01B 3/48* (2013.01); *C01B 3/56* (2013.01);
(Continued)

(58) Field of Classification Search
CPC ...... Y02T 90/32; Y02T 90/34; H01M 8/1231; H01M 8/0656; H01M 8/0637; H01M 8/0618; H01M 2250/20; H01M 8/04201; H01M 8/0675; H01M 8/04097; H01M 8/0668; H01M 8/12; H01M 2008/1293; H01M 2300/0074; H01M 2250/10; H01M 8/0662; B60L 11/1883; Y02E 60/525; Y02E 60/50; Y02E 60/321; C01B 2203/0811; C01B 2203/141; C01B 2203/148; C01B 2203/043; C01B 2203/0455; C01B 2203/066; C01B 2203/1288; C01B 3/48; C01B 3/56; C01B 3/384; C01B 3/382; C01B 2203/0283; C01B 2203/0485; C01B 3/36; C01B 2203/0233; C01B 2203/025; C01B 2203/042; C01B 2203/0822; C01B 2203/0883; C01B 2203/0894; C01B 2203/1235; C01B 2203/1241; C01B 2203/1258; C01B 2203/127;
(Continued)

(56) References Cited

U.S. PATENT DOCUMENTS

| | | |
|---|---|---|
| 8,187,363 B2 | 5/2012 | Grover |
| 2013/0126038 A1* | 5/2013 | Jamal ................. H01M 8/0618 141/5 |

* cited by examiner

*Primary Examiner* — Amber R Orlando
*Assistant Examiner* — Syed T Iqbal
(74) *Attorney, Agent, or Firm* — Justin K. Murray

(57) ABSTRACT

An improved hydrogen generation system and method for using the same are provided. The system includes an HDS unit configured to desulfurize hydrocarbons, a pre-reformer configured to convert heavy hydrocarbons within the process gas stream to methane, a reformer configured to produce a syngas stream and a flue gas, a PSA unit configured to produce a product hydrogen stream and a PSA off-gas stream, and means for cooling the flue gas against a combustion air and the PSA off-gas stream to a temperature below the dew point of sulfuric acid.

20 Claims, 8 Drawing Sheets

(51) Int. Cl.
*C01B 3/56* (2006.01)
*C01B 3/36* (2006.01)
*C10L 3/10* (2006.01)

(52) U.S. Cl.
CPC ........ *C10L 3/103* (2013.01); *C01B 2203/025* (2013.01); *C01B 2203/0233* (2013.01); *C01B 2203/0283* (2013.01); *C01B 2203/042* (2013.01); *C01B 2203/043* (2013.01); *C01B 2203/0822* (2013.01); *C01B 2203/0883* (2013.01); *C01B 2203/0894* (2013.01); *C01B 2203/127* (2013.01); *C01B 2203/1235* (2013.01); *C01B 2203/1241* (2013.01); *C01B 2203/1258* (2013.01); *C01B 2203/142* (2013.01)

(58) Field of Classification Search
CPC ..... C01B 2203/142; Y02B 90/14; F17C 5/06; B65B 1/00; C10L 3/103
See application file for complete search history.

SYSTEM AND METHODS FOR IMPROVING NATURAL GAS USAGE IN STEAM METHANE REFORMERS

TECHNICAL FIELD OF INVENTION

Disclosed are systems and methods for reducing natural gas usage by improving thermal efficiency in steam methane reformers (SMRs) by desulfurizing combustion fuel and preheating a pressure swing adsorption (PSA) off-gas against a sulfur-lean flue gas. In particular, by using desulfurized natural gas as a fuel gas, the temperature of the flue gas to a stack may be lowered without a significant risk of sulfuric acid condensation, and therefore, additional thermal energy from the flue gas may be used to preheat process streams such as the PSA off gas.

BACKGROUND OF THE INVENTION

In large scale SMRs, approximately 50% of the thermal energy input into the firebox of a reformer is transferred to SMR reaction tubes and used to provide energy to drive the endothermic steam methane reforming reaction ($CH_4+H_2O+$ 206 kJ/mol$\rightleftharpoons CO+3H_2$). Since the reforming reaction is generally carried out at a high temperature, e.g., 750° C. to 950° C., the temperature of a flue gas from the burner is generally at this temperature or above. The main usage of the high temperature flue gas is to generate steam through waste heat boilers. In typical SMRs, the flue gas can also be used to preheat combustion air; however, in prior art methods, the temperature of the flue gas must be maintained above the dew point of sulfuric acid to prevent formation of sulfuric acid. The temperature of the sulfuric acid dew point is normally 140° C. or above. The higher the sulfur content, the higher the sulfuric acid dew point. If the temperature of the flue gas is below the dew point of sulfuric acid, the equipment used in the low temperature range of the flue gas channel will encounter sulfuric acid corrosion. In order to eliminate the corrosion, stainless steel is used.

FIG. 1 is a layout of a conventional SMR system for producing hydrogen, carbon monoxide, or other useful products from hydrocarbon fuels such as natural gas (NG). As illustrated, fuel NG is directly fed to the burners of reformer 106 for use as fuel. Reformer 106 includes a combustion zone having a plurality of burners and a reaction zone containing a plurality of reforming tubes. A combustion air is heated through a pair of pre-heaters (cold air pre-heater (CAP) 116 and hot air pre-heater (HAP) 112) before being sent to the burners of reformer 106 for combustion of the fuel NG producing a flue gas stream.

A process natural gas (NG) is heated (not shown) and sent to hydrodesulfurization (HDS) unit 102 to remove sulfur from the natural gas. After that, the process gas is forwarded to pre-reformer 104 for breaking down long chain hydrocarbons in the natural gas into light hydrocarbons (e.g., methane), thereby forming a pre-reformed process NG. The pre-reformed process NG is fed to the reforming tubes in the reaction zone of reformer 106 under reforming conditions effective for converting methane within the process gas stream into carbon monoxide and hydrogen through the endothermic reaction ($CH_4+H_2O+206$ kJ/mol$\rightleftharpoons CO+3H_2$), thereby producing a syngas stream ($H_2+CO$). The synthesis gas is converted to carbon dioxide ($CO_2$) and hydrogen ($H_2$) through shift reactor 108 forming a shifted gas.

The shifted gas is cooled further to ambient temperature before entering PSA unit 110. A product hydrogen stream and a PSA off-gas stream are then produced from PSA unit 110. The PSA off-gas, which includes methane ($CH_4$), carbon dioxide ($CO_2$), hydrogen ($H_2$), and CO, is sent back to the burners of reformer 106 for use as fuel.

The flue gas from reformer 106, which typically has a temperature of about 1000° C., is delivered to different stages of heat exchangers, (i.e., hot air pre-heater (HAP) 112, flue gas boiler (FGB) 114 and cold air pre-heater (CAP) 116) to recapture heat from the flue gas at various temperatures. However, because the fuel NG includes sulfur, the flue gas must be maintained above the sulfuric acid dew point in order to avoid sulfuric acid condensation on the skin of the CAP and other low temperature apparatus in the system. This means that the energy of the flue gas below the sulfuric acid dew point is unused.

U.S. Pat. No. 8,187,363 issued to Grover, et al. discloses a method of preheating a PSA tail gas using low level waste heat in the flue gas or syngas prior to introduction into the SMR furnace combustion system. However, there is no mention of any problems associated with sulfuric acid formation. While Grover teaches recovering low level waste at temperatures between about 250° F. (~120° C.) and about 300° F. (~150° C.), these temperatures are only given as examples when using the syngas as the low level heat source. As such, Grover does not disclose cooling the flue gas to a temperature below the dew point of sulfuric acid, nor is there any discussion of potential problems associated with sulfur formation. Furthermore, no detailed implementation is disclosed.

SUMMARY OF THE INVENTION

The present invention is directed to a system and method for using the same that satisfy at least one of these needs. The present invention is directed to a system and method for using the same that satisfy the need to reduce natural gas consumption in SMRs through preheating PSA off-gas and desulfurizing fuel gas for combustion. Embodiments of the invention allow the SMR to run more efficiently because natural gas used for process gas and fuel gas is desulfurized, which makes it possible to cool a flue gas to a temperature below the dew point of sulfuric acid, thereby allowing for recovery of additional low level heat from the flue gas, which heretofore has gone wasted.

In one embodiment, the system includes one or more HDS units that are configured to desulfurize a hydrocarbon gas stream and produce a process gas stream and a desulfurized fuel gas stream, a pre-reformer configured to receive the process gas stream and convert heavy hydrocarbons within the process gas stream to methane to produce a pre-reformed process gas, wherein the amount of methane within the pre-reformed process gas as compared to the process gas stream is increased, a reformer having a combustion zone and a reaction zone, wherein the combustion zone is in fluid communication with the HDS unit and configured to receive the desulfurized fuel gas stream originating from the HDS, wherein the reaction zone is in fluid communication with the pre-reformer and configured to receive the pre-reformed process gas originating from the pre-reformer, wherein the reformer is configured to produce a syngas stream within the reaction zone and a flue gas within the combustion zone, a pressure swing adsorption (PSA) unit configured to receive the syngas stream and produce a product hydrogen stream and a PSA off-gas stream, and means for cooling the flue gas against a combustion air and the PSA off-gas stream to a temperature below the dew point of sulfuric acid.

In one embodiment, the method includes: a) desulfurizing a hydrocarbon to form a process gas stream and a desulfurized fuel gas stream in a hydrodesulfurization (HDS) unit, b) pre-reforming the process gas stream in a pre-reformer in the presence of steam under conditions effective to form a pre-reformed process gas stream, c) reacting the pre-performed process gas stream in the presence of steam in a reaction zone of a reformer under conditions effective to produce a syngas stream, wherein heat for reacting the pre-performed process gas stream is provided by combusting the desulfurized fuel gas stream in the presence of a combustion oxidant in a combustion zone of the reformer thereby producing a flue gas, wherein the combustion zone is configured to exchange heat with the reaction zone, d) introducing the syngas stream into a pressure swing adsorption (PSA) unit under conditions effective for producing a product hydrogen stream and a PSA off-gas stream, and e) cooling the flue gas against the combustion oxidant and the PSA off-gas stream to a temperature below the dew point of sulfuric acid to produce a cooled flue gas, wherein the cooled flue gas comprises an absence of sulfuric acid.

Optional embodiments also include:
wherein the means for cooling the flue gas comprises an air pre-heater configured to exchange heat between the flue gas and a combustion air, such that the flue gas is cooled and the combustion air is heated;
wherein the means for cooling the flue gas comprises a first PSA off-gas pre-heater configured to exchange heat between the flue gas and the PSA off-gas, such that the flue gas is cooled and the PSA off-gas is heated;
wherein the first PSA off-gas pre-heater is installed upstream of the air pre-heater;
wherein the first PSA off-gas pre-heater is installed downstream of the air pre-heater;
wherein the first PSA off-gas pre-heater is installed in parallel with the air pre-heater such that the first PSA off-gas pre-heater is configured to neither receive nor send a flow directly to the air pre-heater;
a second PSA off-gas pre-heater, wherein the first PSA off-gas pre-heater is installed upstream of the air pre-heater and the second PSA off-gas pre-heater is installed downstream of the air pre-heater;
a second PSA off-gas pre-heater, wherein the first PSA off-gas pre-heater is installed upstream of the air pre-heater and the second PSA off-gas pre-heater is installed in parallel with the air pre-heater and downstream of the first PSA off-gas pre-heater;
a second PSA off-gas pre-heater, wherein the first PSA off-gas pre-heater is installed downstream of the air pre-heater and the second PSA off-gas pre-heater is installed in parallel with the air pre-heater and upstream of the first PSA off-gas pre-heater;
a hydrocarbon source comprising a natural gas pipeline;
cooling the flue gas by exchanging heat between the flue gas and the combustion oxidant in an oxidant pre-heater;
cooling the flue gas by exchanging heat between the flue gas and the PSA off-gas stream in at least one PSA off gas pre-heater to form a pre-heated PSA off-gas stream, wherein the pre-heated PSA off-gas stream is introduced to the combustion zone for combustion therein;
wherein the PSA off-gas pre-heater is installed upstream of the oxidant pre-heater, such that the flue gas exiting the PSA off-gas pre-heater is at a higher temperature than the flue gas exiting the oxidant pre-heater,
wherein the PSA off-gas pre-heater is installed downstream of the oxidant pre-heater, such that the flue gas exiting the PSA off-gas pre-heater is at a lower temperature than the flue gas exiting the oxidant pre-heater;
wherein the PSA off-gas pre-heater is installed in parallel with the oxidant pre-heater such that the PSA off-gas pre-heater is configured to neither receive nor send a flow of flue gas to the oxidant pre-heater;
wherein a first PSA off-gas pre-heater is installed upstream of the oxidant pre-heater and a second PSA off-gas pre-heater is installed downstream of the oxidant pre-heater;
wherein a first PSA off-gas pre-heater is installed upstream of the oxidant pre-heater and a second PSA off-gas pre-heater is installed in parallel with the oxidant pre-heater and downstream of the first PSA off-gas pre-heater;
wherein a first PSA off-gas pre-heater is installed downstream of the oxidant pre-heater and a second PSA off-gas pre-heater is installed in parallel with the oxidant pre-heater and upstream of the first PSA off-gas pre-heater;
wherein the hydrocarbon is natural gas; and/or
wherein the combustion oxidant is air.

BRIEF DESCRIPTION OF THE FIGURES

For a further understanding of the nature and objects of the present invention, reference should be made to the following detailed description, taken in conjunction with the accompanying drawings, in which like elements are given the same or analogous reference numbers and wherein.

DETAILED DESCRIPTION OF THE INVENTION

Figure 1:
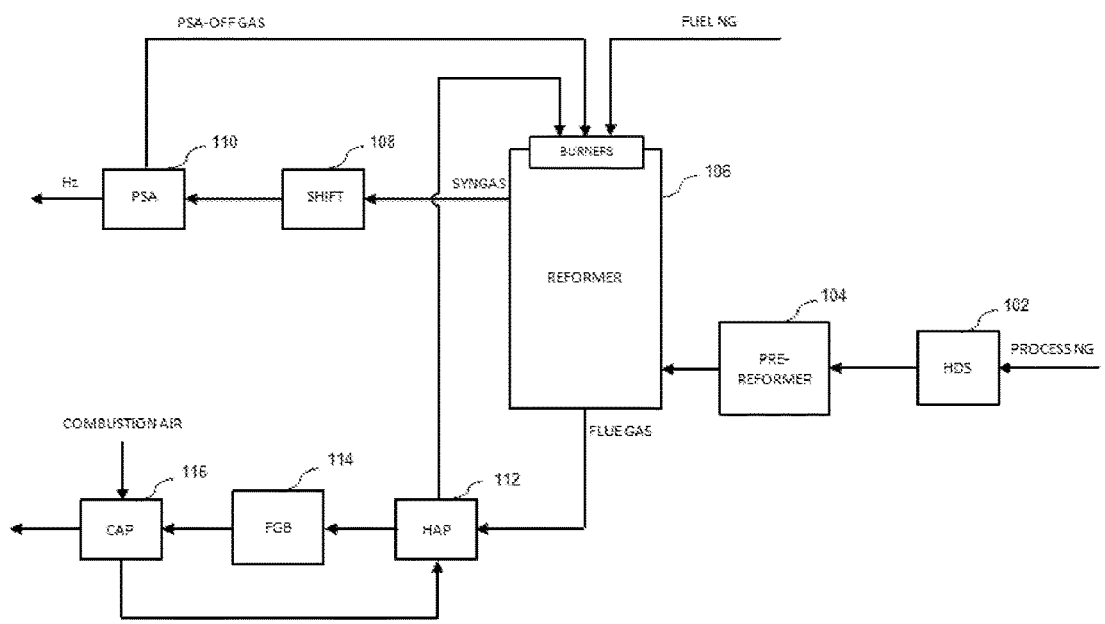
FIG. 1 illustrates a layout of a conventional SMR system.

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

There have been numerous efforts to improve the thermal efficiency of standard SMRs. Pinch analyses show that the standard SMRs have been thermally well optimized, and therefore, further improvements related to heat exchanger designs are unlikely to yield much improvement. However, embodiments of the present invention can advantageously improve methods known heretofore by more effectively recovering waste heat without trying to re-optimize the process by overcoming temperature pinch.

Disclosed embodiments provide a straightforward approach in that a low temperature heat source is used to preheat a PSA off-gas for use as fuel, thereby reducing the use of natural gas and also improving thermal efficiency in SMRs. The low temperature heat source can be a flue gas sourced from the SMR.

In the disclosed embodiments, a desulfurized hydrocarbon gas, e.g., desulfurized natural gas, from an HDS unit is used as a fuel gas stream in order to avoid sulfuric acid condensation issues in any equipment installed in a flue gas channel. Furthermore, a PSA off-gas stream can be pre-heated with one or more PSA off-gas pre-heaters installed upstream of the CAP, downstream of the CAP, parallel with the CAP, or a combination thereof. By desulfurizing the fuel gas, sulfur level in the flue gas becomes negligible so that the flue gas temperature can be lowered below the sulfuric acid dew point without damaging equipment in the low temperature range, and without the use of stainless steel.

By lowering the allowable temperature of the flue gas, additional thermal energy from the flue gas can be recovered by preheating the PSA off-gas. Since the temperature of the PSA off-gas exiting a PSA unit is close to ambient temperature, for example, 35° C., with the disclosed embodiments, the PSA off-gas can be pre-heated from ambient conditions while also cooling the flue gas to temperatures well below the dew point of sulfuric acid with limited risk of the formation of sulfuric acid condensation.

In the disclosed embodiments, one or more PSA off-gas pre-heaters can be added to the SMR systems to pre-heat the PSA off-gas before the PSA off-gas is fed to a plurality of burners in a reformer. In one embodiment in which a single PSA off-gas pre-heater is used, the PSA off-gas pre-heater can be installed at a location respective of the CAP selected from the group consisting of upstream, downstream, or parallel. In an embodiment in which multiple PSA off-gas pre-heaters are used, the PSA off-gas pre-heaters can be installed at locations respective of the CAP selected from the group consisting of upstream, downstream, parallel, and combinations thereof.

Furthermore, in the disclosed embodiments, hydrocarbons, such as natural gas or methane, can be used as a process gas and a fuel gas, and both process gas and fuel gas are desulfurized, thereby the entire system may not have to maintain the temperature of the flue gas downstream of several stages of heat exchangers in the flue gas channel above the sulfuric acid dew point in order to avoid sulfuric acid condensation. In this way, the temperature of the flue gas downstream of several heat exchangers can be maintained without the sulfuric acid condensation on the CAP, the PSA off-gas pre-heaters if any, and any other equipment downstream of the flue gas channel.

With certain disclosed embodiments, the temperature of the PSA off-gas can be increased up to the temperature of the pre-heated combustion air while the temperature of the flue gas can be cooled down to as low as that of water dew point or even further.

Figure 2:
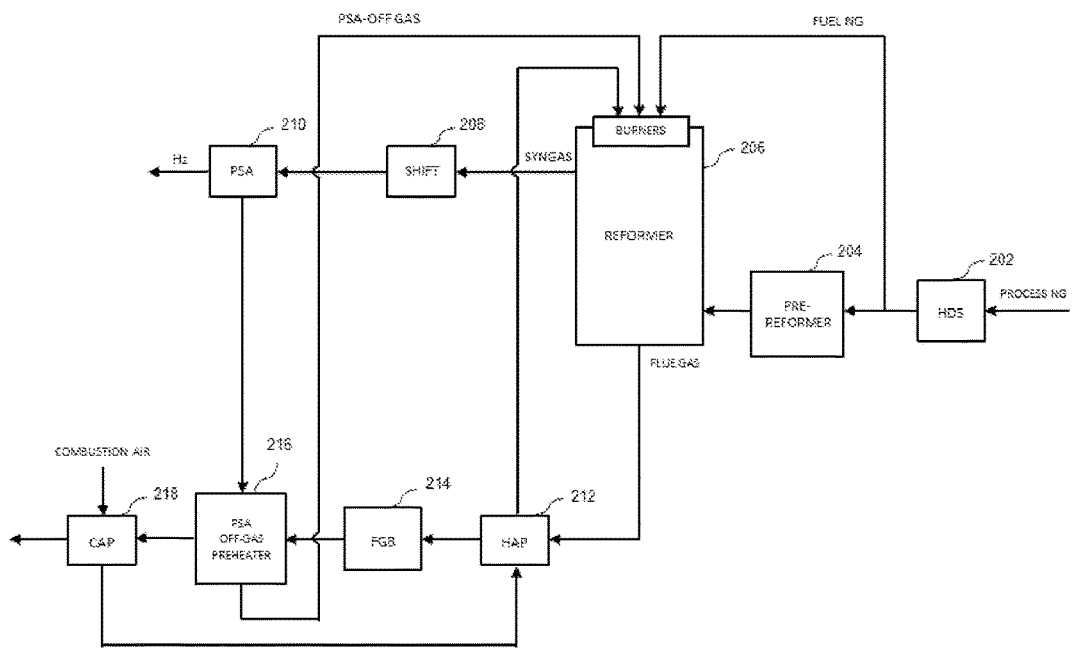
FIG. 2 illustrates a block flow diagram of one embodiment of an SMR system of the present invention.

FIG. 2 illustrates a block flow diagram of one embodiment of an SMR system PSA off-gas wherein a PSA off-gas is pre-heated against a warm flue gas. In this embodiment, a PSA off-gas pre-heater is installed between CAP 218 and flue gas boiler 214 to preheat the PSA off-gas, and both process gas and fuel gas are desulfurized.

As illustrated, a hydrocarbon gas, e.g., natural gas, is preheated (not shown) and fed to HDS unit 202 where sulfur in the natural gas is removed. The natural gas is then split into two streams. A first stream is used as a fuel gas and fed to a plurality of burners of reformer 206, and the second stream is used as a process gas. In an optional embodiment, the process gas can be sent to pre-reformer 204 for breaking down long chain hydrocarbons in the process gas into light hydrocarbons, (e.g., methane), to produce a pre-reformed process gas, which has an increased amount of methane within the process gas and reduces the risk of carbon deposition in reformer 206 as well.

The natural gas can be desulfurized by one HDS unit and then split into two streams (i.e., the process gas and the fuel gas). However, those of ordinary skill in the art will also recognize that the natural gas can also be desulfurized by two HDS units separately, with one HDS unit being used for desulfurizing the process gas, and the other HDS unit being used for desulfurizing the fuel gas. The options of one or two HDS units are suitable for all disclosed embodiments herein.

After pre-reforming the process gas, the pre-reformed process gas is then fed to reformer 206 in the presence of steam for reforming methane into syngas. Reformer 206 can include a reaction zone containing a plurality of reforming tubes, a plurality of burners, and a combustion chamber, wherein the combustion zone is configured to exchange heat with the reaction zone. The pre-reformed process gas and the process steam react in the reforming tubes producing a syngas containing $CO+H_2$. The burners combust the fuel gas in the presence of a combustion air in the combustion zone to provide heat for the endothermic reaction and produce the flue gas. The syngas exits reformer 206 and enters shift reactor 208 in the presence of additional water to produce more $H_2$ by converting CO and steam to $CO_2$ and $H_2$. The syngas downstream of shift reactor 208 is cooled to ambient temperature to knock out water by a syngas dryer (not shown) before entering PSA unit 210. PSA unit 210 separates $H_2$ from a gas mixture of the syngas containing CO, $CO_2$, $H_2$, $CH_4$, etc. The rest of the syngas mixture forms a PSA off-gas that is eventually fed back to the burners of reformer 206 for use as fuel.

The flue gas exiting reformer 206 goes to different stages of heat exchangers for recovering heat. In the embodiment shown, the flue gas first goes into HAP 212 to heat a pre-heated combustion air that has been pre-heated with CAP 218 forming a further heated combustion air. The further heated combustion air is then fed to the burners of reformer 206 in conjunction with the desulfurized fuel gas and the PSA off-gas for combustion in the combustion zone of reformer 206.

The cooled down flue gas is withdrawn from HAP 212 and fed to FGB 214 where steam is generated (not shown) while also further cooling the flue gas. The steam can be used as the process steam. The flue gas downstream of FGB 214 is further cooled down and used to pre-heat the PSA off-gas from PSA unit 210 in PSA off-gas pre-heater 216 before the PSA off-gas is forwarded to the burners of reformer 206 for use as fuel.

In certain embodiments, the PSA off-gas can have an ambient temperature (i.e., about 35° C.) when exiting PSA unit 210. After the PSA off-gas is pre-heated with PSA off-gas pre-heater 216, the temperature of the heated PSA off-gas can increase up to the temperature of the flue gas downstream of FGB 214. The flue gas downstream of PSA off-gas pre-heater 216 is used to heat a cold combustion air with CAP 218 forming the pre-heated combustion air and the pre-heated combustion air is then forwarded to HAP 212 for additional heating. As described above, the further heated combustion air is fed to the burners of reformer 206 for combusting the fuel gas and the pre-heated PSA off-gas therein. In this embodiment, the temperature of the flue gas downstream of CAP 218 can be reduced without sulfuric acid condensation since there is little to no sulfur in the formed flue gas.

Figure 3:
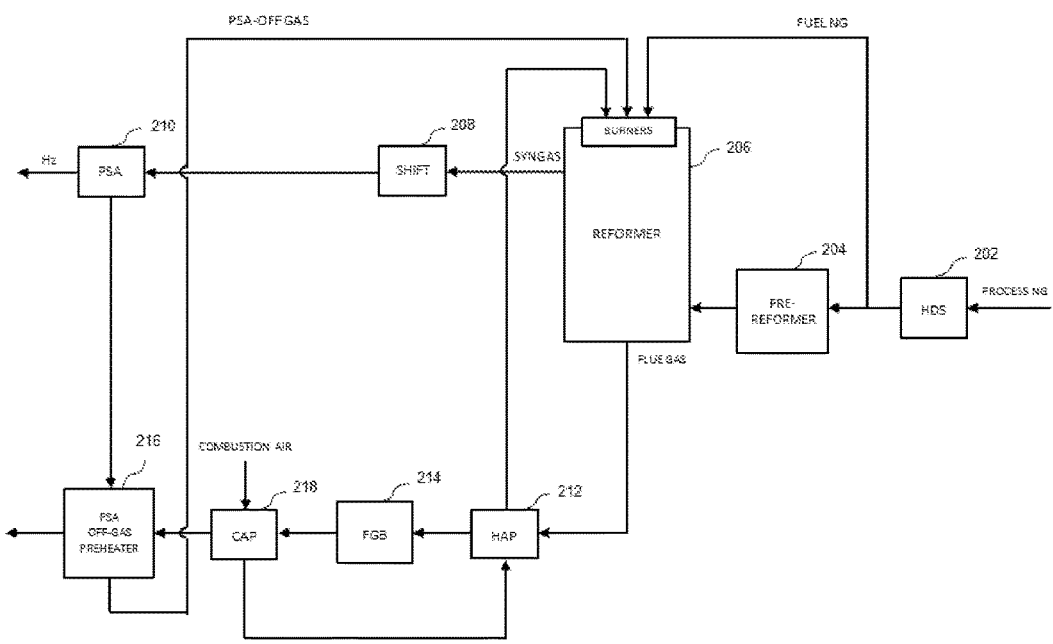
FIG. 3 illustrates a block flow diagram of a second embodiment of an SMR system of the present invention.

FIG. 3 illustrates a block flow diagram of a second embodiment of an SMR system using one PSA off-gas pre-heater to pre-heat the PSA off-gas of the present invention. The primary difference between the two embodiments illustrated in FIG. 3 and FIG. 2 is PSA off-gas pre-heater 216 is installed downstream of CAP 218 in FIG. 3, rather than upstream of CAP 218. In this embodiment, both process gas and fuel gas are also desulfurized.

Figure 4:
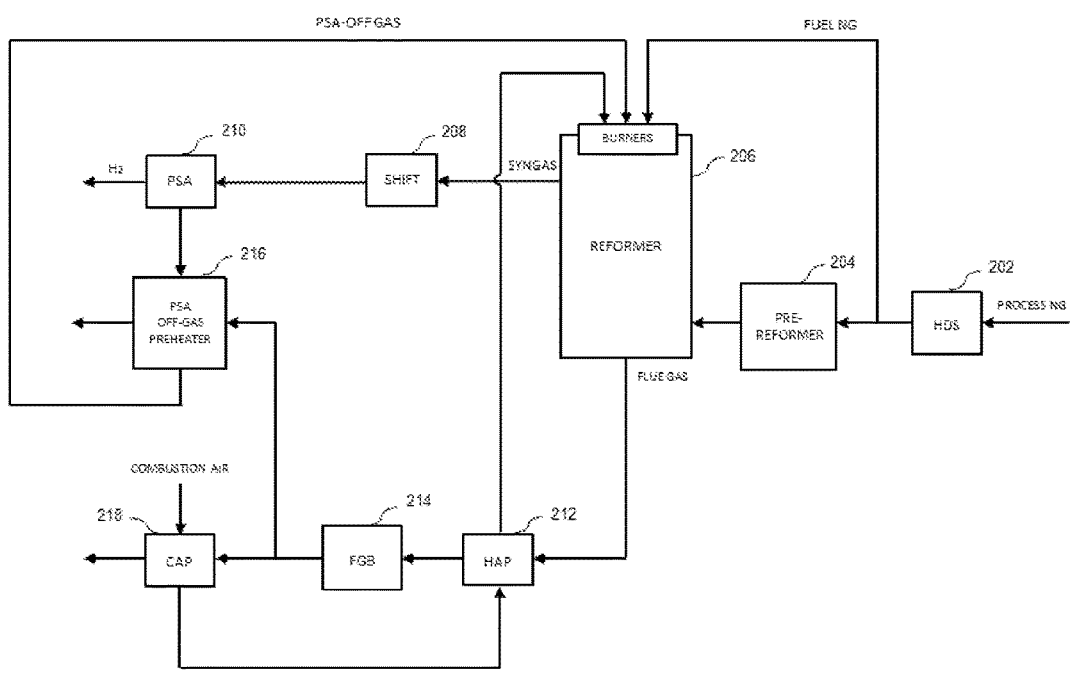
FIG. 4 illustrates a block flow diagram of a third embodiment of an SMR system of the present invention.

FIG. 4 illustrates a block flow diagram of a third embodiment of an SMR system using one PSA off-gas pre-heater to pre-heat the PSA off-gas of the present invention. The primary difference between the two embodiments illustrated in FIG. 4 and FIG. 2 is PSA off-gas pre-heater 216 is installed in parallel with CAP 218 to preheat the PSA off-gas, rather than upstream or downstream of CAP 218. In this embodiment, both process gas and fuel gas are desulfurized, and the flue gas exiting FGB 214 is split into two streams. One stream is used to pre-heat the PSA off-gas from PSA unit 210 in PSA off-gas pre-heater 216 before the PSA off-gas is forwarded to a plurality of burners of reformer 206; the other one is used to pre-heat a clod combustion air with CAP 218. After the PSA off-gas is pre-heated with PSA off-gas pre-heater 216, the temperature of the heated PSA off-gas can be increased up to the temperature of the flue gas downstream of FGB 214. In this embodiment, the temperature of the flue gas downstream of CAP 218 or the downstream of PSA off-gas pre-heater 216 can be reduced without sulfuric acid condensation.

Figure 5:
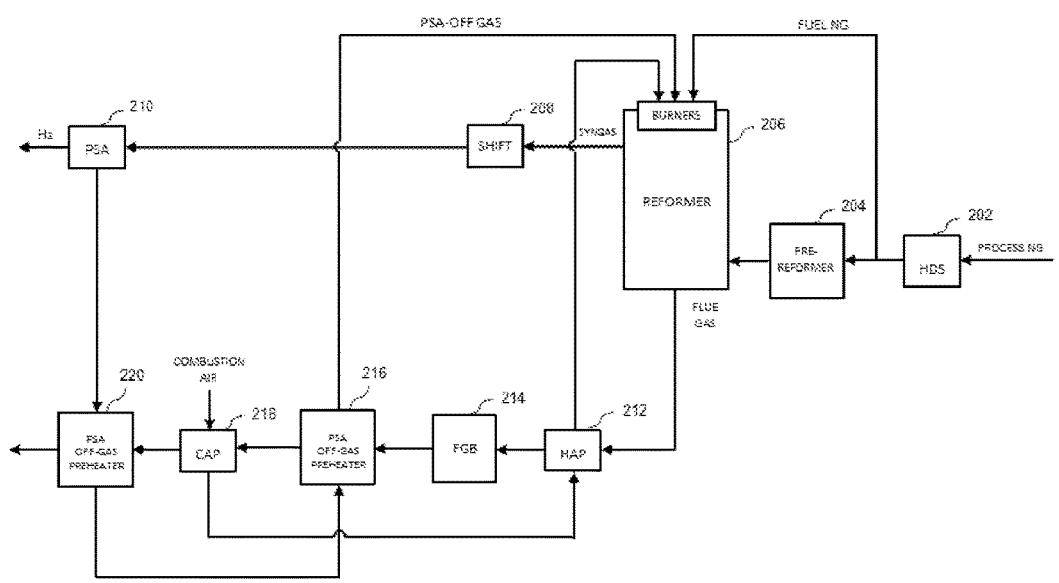
FIG. 5 illustrates a block flow diagram of a fourth embodiment of an SMR system of the present invention.

FIG. 5 illustrates a block flow diagram of a fourth embodiment of an SMR system using two PSA off-gas pre-heaters to pre-heat the PSA off-gas of the present invention. The primary difference between the two embodiments illustrated in FIG. 5 and FIG. 2 is two PSA off-gas pre-heaters (216 and 220) are used, with PSA off-gas pre-heater 216 being upstream CAP 218 and PSA off-gas pre-heater 220 being downstream CAP 218. In this embodiment, PSA off-gas pre-heaters 216 and 220 are installed in series. The PSA off-gas is pre-heated by PSA off-gas pre-heater 220 first and then forwarded to PSA off-gas pre-heater 216 where the PSA off-gas is further pre-heated prior to entering the burners of reformer 206 for use as fuel.

Figure 6:
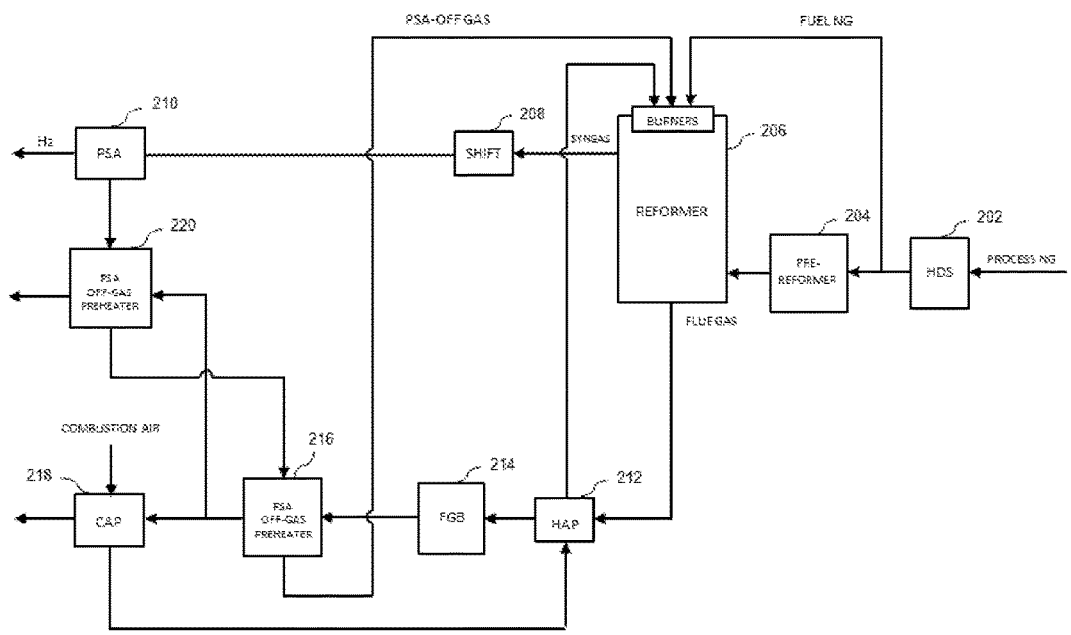
FIG. 6 illustrates a block flow diagram of a fifth embodiment of an SMR system of the present invention.

FIG. 6 illustrates a block flow diagram of a fifth embodiment of an SMR system using two PSA off-gas pre-heaters to pre-heat the PSA off-gas of the present invention. The difference between the embodiments of FIG. 6 and FIG. 2 is, in addition to PSA off-gas pre-heater 216, a second PSA off-gas pre-heater 220 is installed in parallel with CAP 218 in FIG. 6.

Figure 7:
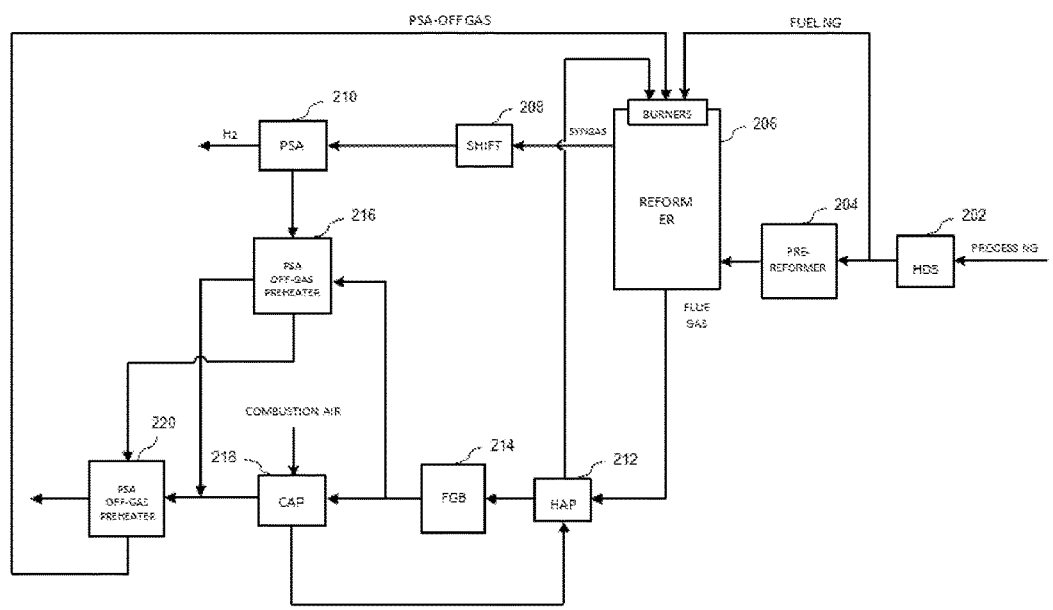
FIG. 7 illustrates a block flow diagram of a sixth embodiment of an SMR system of the present invention.

FIG. 7 illustrates a block flow diagram of a sixth embodiment of an SMR system using two PSA off-gas pre-heaters to pre-heat the PSA off-gas of the present invention. The difference between the embodiments of FIG. 7 and FIG. 4 is, in addition to PSA off-gas pre-heater 216, a second PSA off-gas pre-heater 220 is installed downstream of CAP 218 in FIG. 7.

Figure 8:
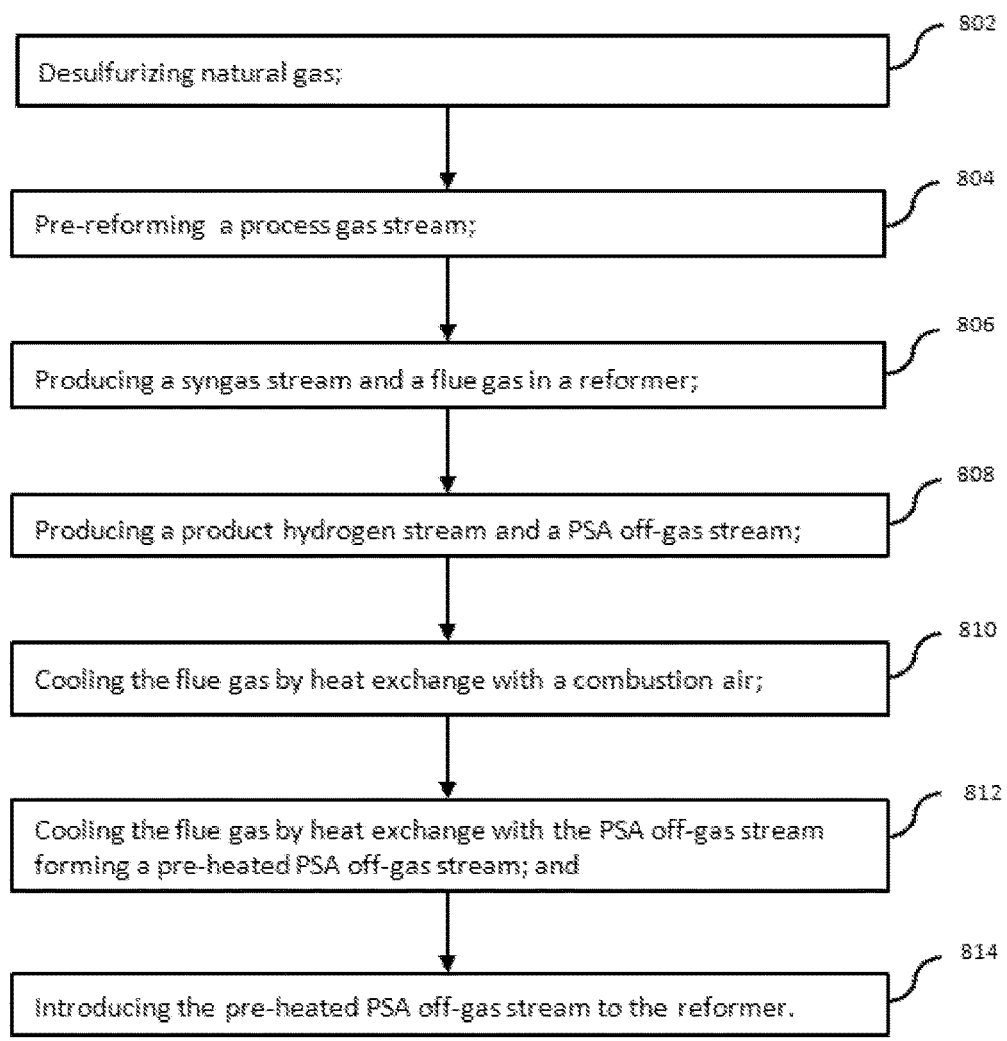
FIG. 8 is a flowchart of a method for operating an SMR system in accordance with an embodiment of the present invention.

FIG. 8 is a flowchart of a method for pre-heating a PSA off-gas for saving natural gas by improving thermal efficiency in an SMR system. At step 802, a hydrocarbon gas (e.g., natural gas) is pre-heated and then desulfurized in an HDS unit to remove sulfur in the natural gas forming a process gas stream and a fuel gas stream by splitting the natural gas into two streams. Here, alternatively, the natural gas can be pre-heated and split into two streams; one stream is desulfurized in one HDS unit forming the process gas stream; the other one is desulfurized in the other HDS unit forming the fuel gas stream. At step 804, the process gas stream can be pre-reformed in a pre-reformer to break down long chain or heavy hydrocarbons existing in the process gas into light hydrocarbons (e.g., methane), thereby increasing the amount of methane within the process gas and avoiding carbon deposition, to produce a pre-reformed process gas. At step 806, the pre-reformed process gas stream can be fed to the reformer where a syngas stream is produced in the reaction zone and a flue gas stream is produced in the combustion zone. In certain embodiments, the reaction zone can include a plurality of reforming tubes, and the combustion zone can also contain a plurality of burners, wherein the combustion zone is configured to exchange heat with the reaction zone.

In certain embodiments, the pre-reformed process gas mixing with the process steam reacts in the reforming tubes in the reaction zone of the reformer, thereby producing the syngas stream. A plurality of burners of the reformer combust the fuel gas and the PSA off-gas in the presence of an oxidant (e.g., the combustion air) in the combustion zone of the reformer for providing heat for the endothermic reforming reaction to produce the flue gas therefrom. As used herein, combustion air can also include an oxygen enriched gas stream or synthetic air.

In certain embodiments, the process steam can be added to the process gas stream before the process gas stream entering the pre-reformer. The process steam can be also added to the pre-reformed process gas before the pre-reformed process gas entering the reformer. At step 808, the CO in the syngas stream can be converted to carbon dioxide and hydrogen in the presence of the process steam in a shift converter for producing more hydrogen.

The converted syngas stream can be dried in a syngas dryer and then introduced into a PSA unit to produce a product of hydrogen stream and the PSA off-gas stream. The PSA off-gas stream can contain $CO_2$, CO, $CH_4$, $H_2$, etc. and is fed back to the reformer for use as fuel. At step 810, the flue gas exiting the reformer can be cooled by heat exchange with a cold combustion air for feeding to the burners. The cold combustion air can be heated by the flue gas in a CAP first and then in a HAP where a flue gas boiler can be installed in between to generate steam for use as the process steam.

At step 812, the flue gas can be further cooled by heat exchange with the PSA off-gas stream withdrawn from the PSA unit. Here, the PSA off-gas stream can be pre-heated by one or two PSA off-gas pre-heaters arranged upstream, downstream, or parallel with the CAP, or a combination thereof. The pre-heated PSA off-gas before entering the reformer can have a temperature up to the temperature of the flue gas downstream of the flue gas boiler or downstream of the CAP depending on the arrangement of the PSA off-gas pre-heater(s).

Since sulfur is removed in the process gas stream and fuel gas stream, the temperature of the flue gas after pre-heating the PSA off-gas can be reduced below the dew point of sulfuric acid without sulfuric acid condensation in the SMR system, which helps to eliminate corrosion of the equipment operated in the low temperature range. In certain embodiments, this advantageously allows for use of carbon steel instead of stainless steel. At step 814, the pre-heated PSA off-gas stream can be fed to the burners of the reformer for use as fuel where the burners combust the pre-heated PSA off-gas and the fuel gas in the presence of the combustion air in the combustion zone of the reformer, in which the combustion air is pre-heated in the CAP and the HAP.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it may be recognized by those skilled in the art that certain steps may be combined into a single step.

Note that herein, the terms "heavy hydrocarbon", "heavier hydrocarbon", "higher hydrocarbon" and "long chain hydrocarbon" refer to $C_2$ and $C_{2+}$ hydrocarbon and may be used interchangeably.

The singular forms "a", "an" and "the" include plural referents, unless the context clearly dictates otherwise.

"About" or "around" or "approximately" in the text or in a claim means±10% of the value stated.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An improved hydrogen generation system comprising:
   one or more hydrodesulfurization (HDS) units configured to desulfurize a hydrocarbon gas stream to produce a process gas stream and a desulfurized fuel gas stream;
   a pre-reformer configured to receive the process gas stream and convert heavy hydrocarbons within the process gas stream to methane to produce a pre-reformed process gas, wherein the amount of methane within the pre-reformed process gas as compared to the process gas stream is increased;
   a reformer having a combustion zone and a reaction zone, wherein the combustion zone is in fluid communication with the HDS unit and configured to receive the desulfurized fuel gas stream originating from the HDS, wherein the reaction zone is in fluid communication with the pre-reformer and configured to receive the pre-reformed process gas originating from the pre-reformer, wherein the reformer is configured to produce a syngas stream within the reaction zone and a flue gas within the combustion zone;
   a pressure swing adsorption (PSA) unit configured to receive the syngas stream and produce a product hydrogen stream and a PSA off-gas stream; and
   means for cooling the flue gas against a combustion air and the PSA off-gas stream to a temperature below the dew point of sulfuric acid.

2. The system of claim 1, wherein the means for cooling the flue gas comprises an air pre-heater configured to exchange heat between the flue gas and a combustion air, such that the flue gas is cooled and the combustion air is heated.

3. The system of claim 2, wherein the means for cooling the flue gas comprises a first PSA off-gas pre-heater configured to exchange heat between the flue gas and the PSA off-gas, such that the flue gas is cooled and the PSA off-gas is heated.

4. The system of claim 3, wherein the first PSA off-gas pre-heater is installed upstream of the air pre-heater.

5. The system of claim 3, wherein the first PSA off-gas pre-heater is installed downstream of the air pre-heater.

6. The system of claim 3, wherein the first PSA off-gas pre-heater is installed in parallel with the air pre-heater such that the first PSA off-gas pre-heater is configured to neither receive nor send a flow directly to the air pre-heater.

7. The system of claim 3, further comprising a second PSA off-gas pre-heater, wherein the first PSA off-gas pre-heater is installed upstream of the air pre-heater and the second PSA off-gas pre-heater is installed downstream of the air pre-heater.

8. The system of claim 3, further comprising a second PSA off-gas pre-heater, wherein the first PSA off-gas pre-heater is installed upstream of the air pre-heater and the second PSA off-gas pre-heater is installed in parallel with the air pre-heater and downstream of the first PSA off-gas pre-heater.

9. The system of claim 3, further comprising a second PSA off-gas pre-heater, wherein the first PSA off-gas pre-heater is installed downstream of the air pre-heater and the second PSA off-gas pre-heater is installed in parallel with the air pre-heater and upstream of the first PSA off-gas pre-heater.

10. The system of claim 1, further comprising a hydrocarbon source comprising a natural gas pipeline.

11. A method for improving thermodynamic efficiency in a hydrogen generation system, the method comprising the steps of:
    desulfurizing a hydrocarbon gas stream in one or more hydrodesulfurization (HDS) units to form a process gas stream and a desulfurized fuel gas stream;
    pre-reforming the process gas stream in a pre-reformer in the presence of steam under conditions effective to form a pre-reformed process gas stream;
    reacting the pre-performed process gas stream in the presence of steam in a reaction zone of a reformer under conditions effective to produce a syngas stream, wherein heat for reacting the pre-performed process gas stream is provided by combusting the desulfurized fuel gas stream in the presence of a combustion oxidant in a combustion zone of the reformer thereby producing a flue gas, wherein the combustion zone is configured to exchange heat with the reaction zone;
    introducing the syngas stream into a pressure swing adsorption (PSA) unit under conditions effective for producing a product hydrogen stream and a PSA off-gas stream; and
    cooling the flue gas against the combustion oxidant and the PSA off-gas stream to a temperature below the dew point of sulfuric acid to produce a cooled flue gas, wherein the cooled flue gas comprises an absence of sulfuric acid.

12. The method of claim 11, wherein the step of cooling the flue gas against the combustion oxidant and the PSA off-gas stream further comprises the step of cooling the flue gas by exchanging heat between the flue gas and the combustion oxidant in an oxidant pre-heater.

13. The method of claim 12, wherein the step of cooling the flue gas against the combustion oxidant and the PSA off-gas stream further comprises the step of cooling the flue gas by exchanging heat between the flue gas and the PSA off-gas stream in at least one PSA off gas pre-heater to form a pre-heated PSA off-gas stream, wherein the pre-heated PSA off-gas stream is introduced to the combustion zone for combustion therein.

14. The method of claim 13, wherein the PSA off-gas pre-heater is installed upstream of the oxidant pre-heater, such that the flue gas exiting the PSA off-gas pre-heater is at a higher temperature than the flue gas exiting the oxidant pre-heater.

15. The method of claim 13, wherein the PSA off-gas pre-heater is installed downstream of the oxidant pre-heater, such that the flue gas exiting the PSA off-gas pre-heater is at a lower temperature than the flue gas exiting the oxidant pre-heater.

16. The method of claim 13, wherein the PSA off-gas pre-heater is installed in parallel with the oxidant pre-heater such that the PSA off-gas pre-heater is configured to neither receive nor send a flow of flue gas to the oxidant pre-heater.

17. The method of claim 13, wherein a first PSA off-gas pre-heater is installed upstream of the oxidant pre-heater and a second PSA off-gas pre-heater is installed downstream of the oxidant pre-heater.

18. The method of claim 13, wherein a first PSA off-gas pre-heater is installed upstream of the oxidant pre-heater and a second PSA off-gas pre-heater is installed in parallel with the oxidant pre-heater and downstream of the first PSA off-gas pre-heater.

19. The method of claim 11, wherein a first PSA off-gas pre-heater is installed downstream of the oxidant pre-heater and a second PSA off-gas pre-heater is installed in parallel with the oxidant pre-heater and upstream of the first PSA off-gas pre-heater.

20. The method of claim 11, wherein the hydrocarbon is natural gas and the combustion oxidant is air.

* * * * *